US012454363B2

(12) United States Patent
West

(10) Patent No.: US 12,454,363 B2
(45) Date of Patent: Oct. 28, 2025

(54) ENGINE SUPPORT ASSEMBLY

(71) Applicant: Spirit AeroSystems, Inc., Wichita, KS (US)

(72) Inventor: Randall Ray West, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 6 days.

(21) Appl. No.: 18/330,481

(22) Filed: Jun. 7, 2023

(65) Prior Publication Data
US 2024/0409226 A1 Dec. 12, 2024

(51) Int. Cl.
*B64D 27/40* (2024.01)
*B64D 27/14* (2006.01)
*B64D 29/04* (2006.01)
*F02C 7/20* (2006.01)
*F02K 1/70* (2006.01)

(52) U.S. Cl.
CPC ............. *B64D 27/40* (2024.01); *B64D 27/14* (2013.01); *B64D 29/04* (2013.01); *F02C 7/20* (2013.01); *F02K 1/70* (2013.01)

(58) Field of Classification Search
CPC ........................ B64D 27/40–406; B64D 27/14; B64D 27/20; B64D 29/04; B64C 1/16; B64C 2039/105
See application file for complete search history.

(56) References Cited

U.S. PATENT DOCUMENTS

| | | | | |
|---|---|---|---|---|
| 3,666,211 A | * | 5/1972 | Cathers | B64D 27/20 244/54 |
| 4,150,802 A | * | 4/1979 | Evelyn | B64D 29/00 244/54 |
| 5,230,213 A | * | 7/1993 | Lawson | F02K 1/60 244/110 B |
| 5,497,961 A | * | 3/1996 | Newton | B64D 29/00 244/54 |
| 5,548,954 A | * | 8/1996 | de Cambray | F02K 1/70 239/265.29 |
| 6,402,092 B1 | * | 6/2002 | Jean | F02K 1/70 244/110 B |
| 7,240,877 B2 | | 7/2007 | Cazals et al. | |
| 8,186,618 B2 | | 5/2012 | Beaufort | |
| 8,196,859 B2 | | 6/2012 | Marche et al. | |
| 11,613,372 B2 | | 3/2023 | Aten | |
| 2004/0068978 A1 | * | 4/2004 | Lair | F02K 1/763 60/226.2 |

(Continued)

OTHER PUBLICATIONS

Extended European Search Report, Europe Patent Application No. 24180056.6, dated Sep. 30, 2024, 9 pages, European Patent Office, Munich, Germany.

*Primary Examiner* — Lorne E Meade
*Assistant Examiner* — Marc Amar
(74) *Attorney, Agent, or Firm* — Stinson LLP

(57) ABSTRACT

An engine support assembly for operatively connecting an engine to an aircraft, the aircraft, the aircraft having a support frame surrounded by opposing first and second skins. The engine support assembly broadly comprises first and second support structures. The first support structure is secured to the support frame and extends away from the first skin. The second support structure is releasably connected to the first support structure and releasably connected to the engine.

11 Claims, 5 Drawing Sheets

(56) References Cited

U.S. PATENT DOCUMENTS

| | | | | |
|---|---|---|---|---|
| 2004/0195454 A1* | 10/2004 | Page | ...................... | B64U 10/20 |
| | | | | 244/120 |
| 2008/0083210 A1* | 4/2008 | Sternberger | .............. | F02K 1/70 |
| | | | | 60/230 |
| 2010/0043450 A1* | 2/2010 | Marche | ................... | B64C 39/10 |
| | | | | 60/797 |
| 2010/0108802 A1* | 5/2010 | Marche | ................. | B64D 27/20 |
| | | | | 244/54 |
| 2010/0281849 A1* | 11/2010 | Vauchel | ................... | F02K 1/70 |
| | | | | 60/226.2 |
| 2011/0197595 A1* | 8/2011 | Journade | ................ | F01D 25/28 |
| | | | | 60/797 |
| 2012/0138736 A1* | 6/2012 | Cazals | ...................... | B64C 1/26 |
| | | | | 244/54 |
| 2015/0098810 A1* | 4/2015 | Soria | ..................... | B64D 29/06 |
| | | | | 415/200 |
| 2017/0240288 A1* | 8/2017 | Pautis | ................... | B64D 27/16 |
| 2018/0134402 A1 | 5/2018 | Hellegouarch et al. | | |
| 2018/0334259 A1* | 11/2018 | Aten | ..................... | B64D 27/40 |
| 2019/0032518 A1 | 1/2019 | Suciu et al. | | |
| 2019/0061966 A1* | 2/2019 | West | ...................... | B64D 29/06 |
| 2022/0144442 A1* | 5/2022 | Aten | ......................... | F02K 1/52 |

\* cited by examiner

ENGINE SUPPORT ASSEMBLY

BACKGROUND

1. Field of the Invention

Embodiments of the present invention are directed to an engine support assembly. More particularly, embodiments are directed to a support assembly configured to secure an engine to an aircraft.

2. Description of the Prior Art

Traditionally, turbofan engines are mounted below or to the side of the body or wings of large aircraft. Such is the case with most commercial jets, for which the engines are typically mounted below the wings. For many corporate jets, the engines are mounted to the sides of the aircraft bodies. As such, typical turbofan engines for aircraft include mounting connections at the top or sides of the engines and/or associated nacelles.

In contrast, alternative airframe architectures, such as blended wing body (BWB) or hybrid wing body (HWB) aircraft architectures, require engines to be located and/or mounted above the airframes. Given such non-traditional engine mounting requirements, it is difficult to mount typical turbofan engines to such alternative airframe architectures. As such, there is a need for an engine support assembly configured to support typical turbofan engines on alternative airframe architectures, such as an engine support assembly that can mount an engine above or on top of an airframe.

SUMMARY

Embodiments of the invention include a support assembly for an aircraft including an aircraft body having a support frame surrounded by opposing first and second skins. The engine support assembly broadly comprises first and second support structures. The first support structure is secured to the support frame. The second support structure is releasably connected to the first support structure and releasably connected to the engine.

Additional embodiments of the invention include a nacelle for operatively connecting an engine to an aircraft having a support frame surrounded by opposing first and second skins. The nacelle broadly comprises an engine support assembly and a plurality of bypass flow assemblies. The engine support assembly includes first and second support structures. The first support structure is secured to the support frame and extends away from the first skin. The second support structure is releasably connected to the first support structure and releasably connected to the engine. Some of the bypass flow assemblies are directly or indirectly connected to the first support structure and some of the bypass flow assemblies are directly or indirectly connected to the second support structure.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein.

Figure 1:
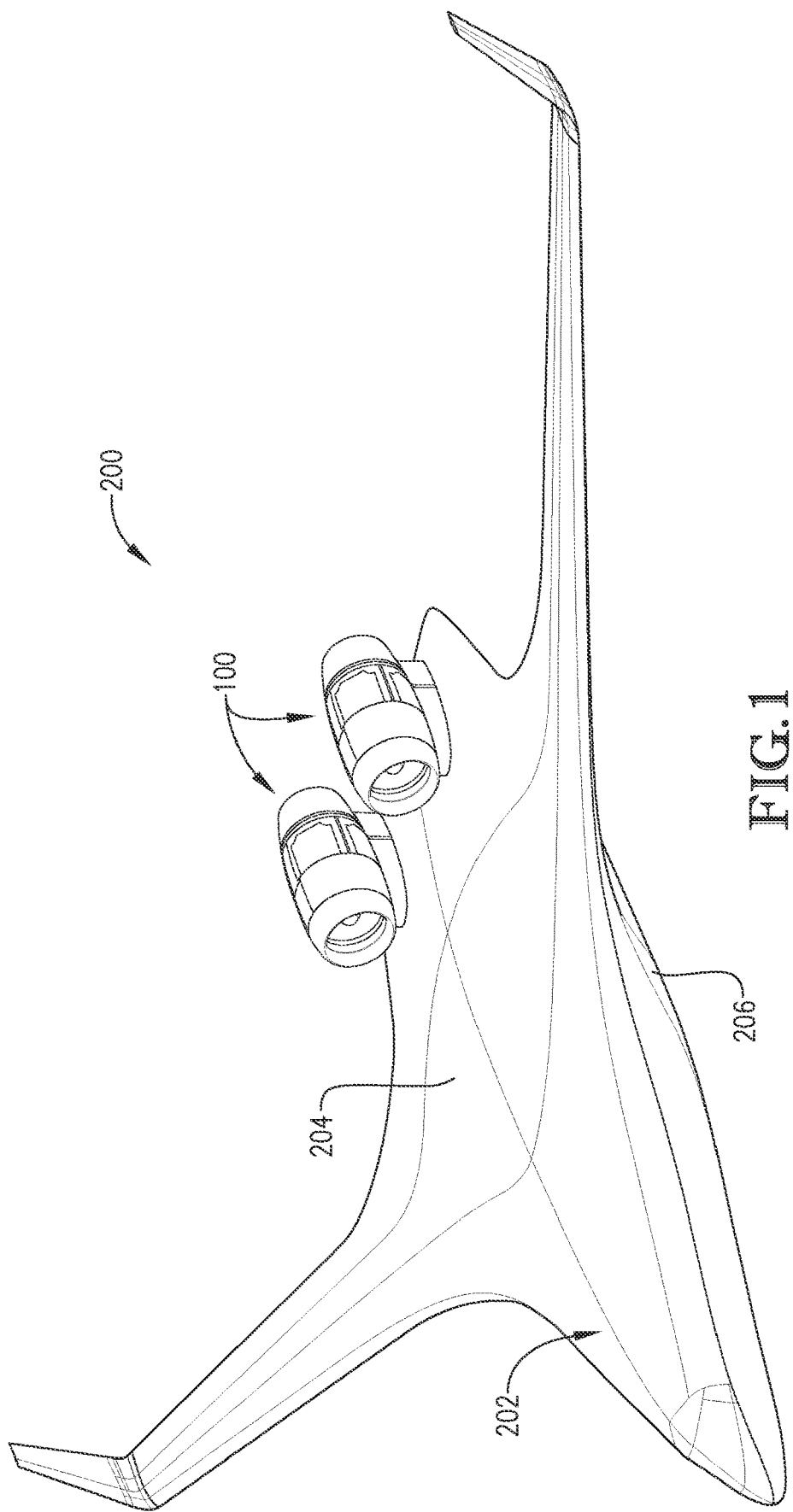
FIG. 1 is a perspective view of an aircraft incorporating engine support assemblies constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made, without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein. Directional terms such as "longitudinal" and "lateral" are generally in reference to a standard aircraft orientation. For example, longitudinal features may be generally aligned with the aircraft's primary direction of travel while lateral features may extend horizontally perpendicular to the aircraft's primary direction of travel.

Turning to FIG. 1, the present invention may be incorporated into an aircraft 200 having blended wing body (BWB), alternatively known as hybrid wing body (HWB), architecture. For example, the aircraft 200 may have an aircraft body 202 including a support frame (not shown) surrounded by a first skin 204 and an opposing second skin 206. The aircraft 200 may also have engines (described below) supported on the aircraft 200 via engine support assemblies 100.

Figure 2:
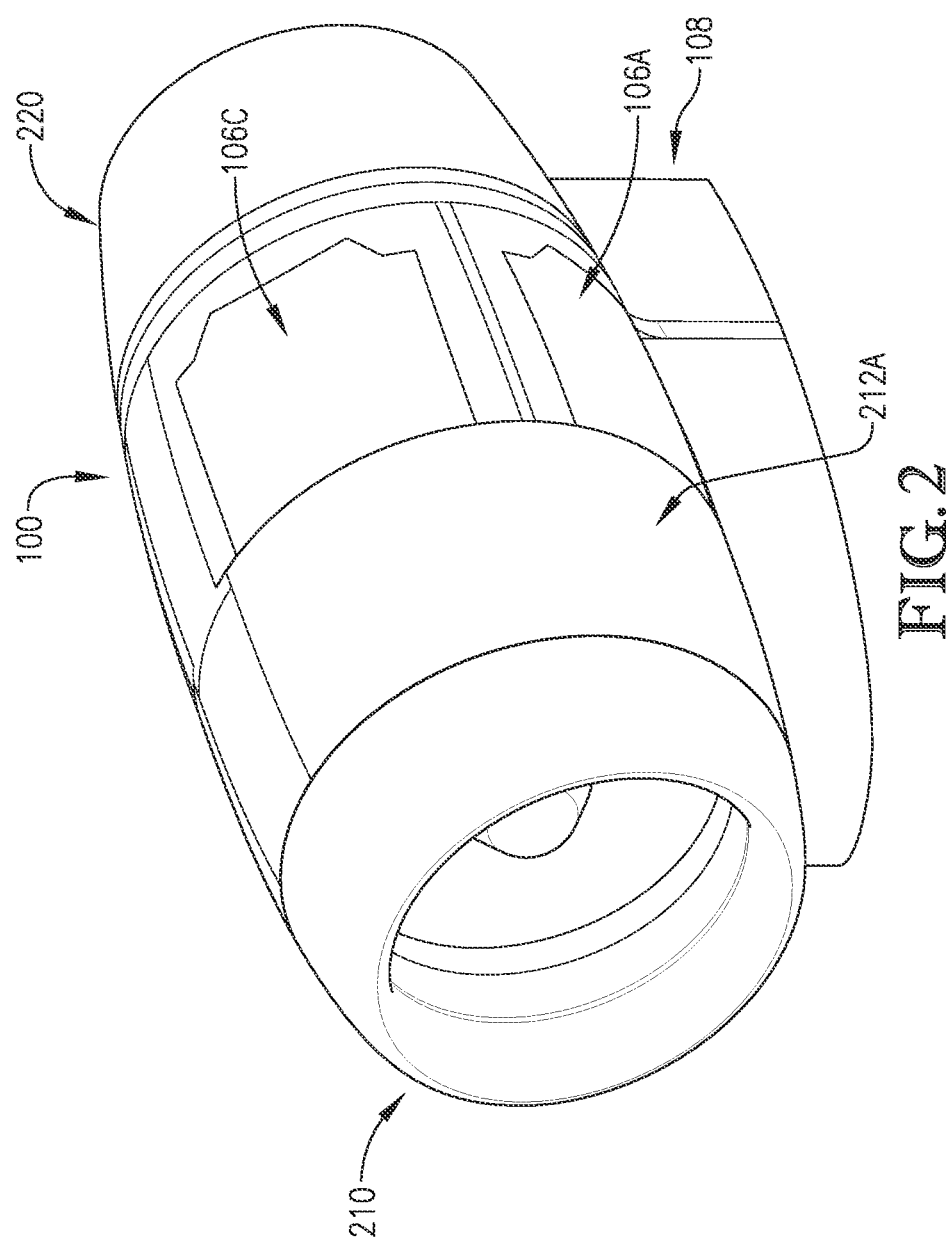
FIG. 2 is an enlarged perspective view of an engine support assembly of FIG. 1.

The engine support assemblies 100 are substantially similar and thus only one of the engine support assemblies 100 (best seen in FIGS. 2-4) will be described in detail. The engine support assembly 100 broadly comprises a first support structure 102, a second support structure 104, a plurality of bypass flow modules 106A-D, and a fairing 108.

The engine support assembly 100 supports engine 208 (best seen in FIG. 4), which is depicted, for illustrative purposes, as a high-bypass turbofan engine with a separate flow nacelle. However, engines having other configurations may be used. The engine is mounted on the top side of the aircraft 200 either to the support frame of the aircraft body 202, the first skin 204, or other features such as aft-extending booms. The engine 208 includes an inlet 210, a plurality of fan cowl doors 212A,B, a fan casing 214, an exhaust nozzle 216, inner flow surface panels 218A,B, and an aft fan duct 220. Importantly, the engine 208 (being of the type conventionally mounted on the underside of an aircraft wing or aircraft body) includes connection points on or near its top side, such as first attachment point 222 near the fan casing 214 and second attachment point 224 near the exhaust nozzle 216 (for example), despite the engine 208 being mounted above the top side 206 of the aircraft 200. These components are conventional and will not be described further.

The first support structure 102 is secured to the top side of the aircraft 200 (directly to the support frame of the aircraft 200, the first skin 204, or to other components such as aft-extending booms) and broadly comprises a forward attachment member 110 and a rearward attachment member 112. In one embodiment, the first support structure 102 is integrated into the aircraft 200.

The forward attachment member 110 extends above the aircraft body 202 and beneath the engine 208 and includes a single stem or base 114 and opposing legs 116A,B. In one embodiment, the forward attachment member 110 is approximately aligned with a rear of a fan casing 214 of the engine 208. In one embodiment, the forward attachment member 110 is adjacent to fan cowl doors 212A, B of the engine 208.

The base 114 spaces the engine 208 above the first skin 204 of the aircraft body 202, which separates an air intake of the engine 208 from a boundary layer of air flowing over the first skin 204. In one embodiment, the base 114 is laterally aligned with and under the engine 208. In other embodiments, two or more bases may be used.

The opposing legs 116A, B extend outward (e.g., in an arcuate manner) relative to each other from the base 114 to at least partially encircle the engine 208 from underneath. Leg 116A includes connection point 118A near its upper/distal end, and leg 116B includes connection point 118B near its upper/distal end. Each of the connection points 118A,B is configured to receive a shear fastener, a bracing, a connection pin, or the like for connecting the first support structure 102 to the second support structure 104.

The rearward attachment member 112 extends above the aircraft body 202 and beneath the engine 208 and includes a single stem or base 120 and opposing legs 122A,B. In one embodiment, the rearward attachment member 112 is spaced from the forward attachment member 110. In one embodiment, the rearward attachment member 112 is approximately aligned with a rear of the engine 208.

The base 120 spaces the engine 208 above the first skin 204 of the aircraft body 202, which separates an intake of the engine 208 from a boundary layer of air flowing over the first skin 204 of the aircraft body 202. In one embodiment, the base 120 is laterally aligned with and under the engine 208. In other embodiments, two or more bases may be used.

The opposing legs 122A,B extend outward (e.g., in an arcuate manner) relative to each other from the base 120 to at least partially encircle the engine 208 from underneath. Leg 122A includes connection point 124A. Leg 122B includes connection point 124B. Each of the connection points 124A, B is configured to receive a shear fastener, a bracing, a connection pin, or the like for connecting the first support structure 102 to the second support structure 104.

The forward attachment member 110 and rearward attachment member 112 cradle a first portion of the engine 208. In this way, the engine 208 can be lowered onto and lifted from the first support structure 102.

The second support structure 104 is removably connectable to the first support structure 102 and broadly comprises a forward attachment member 126, a rearward attachment member 128, and a backbone assembly 130.

The forward attachment member 126 extends over the engine 208 and includes opposing legs 132A,B. In one embodiment, the forward attachment member 126 is approximately aligned with a rear of a fan casing 214. In one embodiment, the forward attachment member 126 is adjacent to fan cowl doors 212A,B of the engine 208.

The opposing legs 132A,B extend outward (e.g., in an arcuate manner) relative to each other toward the opposing legs 116A,B of the forward attachment member 110 to at least partially encircle the engine 208 from above. Leg 132A includes connection point 134A near its lower/distal end, and leg 132B includes connection point 134B near its upper/distal end. Each of the connection points 134A, B is configured to receive a shear fastener, a bracing, a connection pin, or the like for connecting the second support structure 104 to the first support structure 102. Specifically, the connection points 134A, B connect with the connection points 118A, B to facilitate connection between the legs of the second support structure 104 and the legs of the first support structure 102.

The rearward attachment member 128 extends over the engine 208 and includes opposing legs 136A,B. In one embodiment, the rearward attachment member 128 is spaced from the forward attachment member 126. In one embodiment, the rearward attachment member 128 is approximately aligned with a rear of the engine 208.

The opposing legs 136A, B extend outward (e.g., in an arcuate manner) relative to each other toward the opposing legs 122A,B of the rearward attachment member 112 to at least partially encircle the engine 208 from above. Leg 136A includes connection point 138A near its lower/distal end, and leg 136B includes connection point 138B near its lower/distal end. Each of the connection points 138A, B is configured to receive a shear fastener, a bracing, a connection pin, or the like for connecting the second support structure 104 to the first support structure 102. Specifically, the connection points 138A, B connect with the connection points 124A,B to facilitate connection between the legs of the second support structure 104 and the legs of the first support structure 102.

The forward attachment member 126 and rearward attachment member 128 straddle a second portion of the engine 208. In this way, the first support structure 102 and second support structure 104 cooperatively encircle the engine 208 entirely when assembled.

The backbone assembly 130 includes a first backbone section 140, a second backbone section 142, and portions of the opposing legs 132A, B and 136A, B. The backbone assembly 130 directly supports weight of the engine 208 and transfers thrust/propulsive forces (as well as weight forces) upward from the engine 208 to the legs 132A,B and 136A, B of the second support structure 104. Furthermore, such forces are transferred downward from the second support structure 104 to the first support structure 102 (e.g., via connection between the legs 132A,B and 136A,B and the legs 116A,B and 122A,B), and downward from the first support structure 102 to the aircraft body 202. A top side of the backbone assembly 130 is aerodynamically shaped to reduce drag.

The first backbone section 140 extends forward from the forward attachment member 126 and includes a forward engine connection point 144 near forward attachment member 126. The first backbone section 140 also includes connections/supports for fan cowl doors 212A, B when they are installed. The first backbone section 140 is flanked by the fan cowl doors 212A, B when the engine 208 is fully installed.

The second backbone section 142 extends longitudinally between the forward attachment member 126 and the rearward attachment member 128 and includes a rearward engine connection point 146 near a bottom side of its aft end. For increased rigidity, the rearward section forms a wedge shape. Illustrations included herein depict a certain engine connection. Other engine connections are adaptable and may include more or fewer connections in different locations than those shown.

The bypass flow modules 106A-D enclose the engine 208 thereby forming a bypass flow path. The bypass flow modules 106A-D are substantially similar and differ mainly in their installation location. Bypass flow module 106A is positioned between leg 116A of the forward attachment member 110 and leg 122A of the rearward attachment member 112 of the first support structure 102. Bypass flow module 106B is positioned between leg 116B of the forward attachment member 110 and leg 122B of the rearward attachment member 112 of the first support structure 102. Bypass flow module 106C is positioned between leg 132A of the forward attachment member 126 and leg 136A of the rearward attachment member 128 of the second support structure 104. Bypass flow module 106D is positioned between leg 132B of the forward attachment member 126 and leg 136B of the rearward attachment member 128 of the second support structure 104.

The bypass flow modules 106A-D provide rigidity to the first support structure 102 and second support structure 104. To that end, Bypass flow module 106A is connected to leg 116A and leg 122A. Bypass flow module 106B is connected to leg 116B and leg 122B. Bypass flow module 106C is connected to leg 132A, leg 136A, and/or the second backbone section 142 of the backbone assembly 130. Bypass flow module 106D is connected to leg 132B, leg 136B, and/or the second backbone section 142 of the backbone assembly 130. As such, the bypass flow modules 106A-D are configured to transfer forces between the opposing legs of the forward attachment members 110,126 and the rearward attachment members 112,128. In another embodiment, the bypass flow modules 106A-D provide airflow guidance while separate crossmembers installed near the bypass flow modules 106A-D between adjacent legs provide rigidity.

Figure 3:
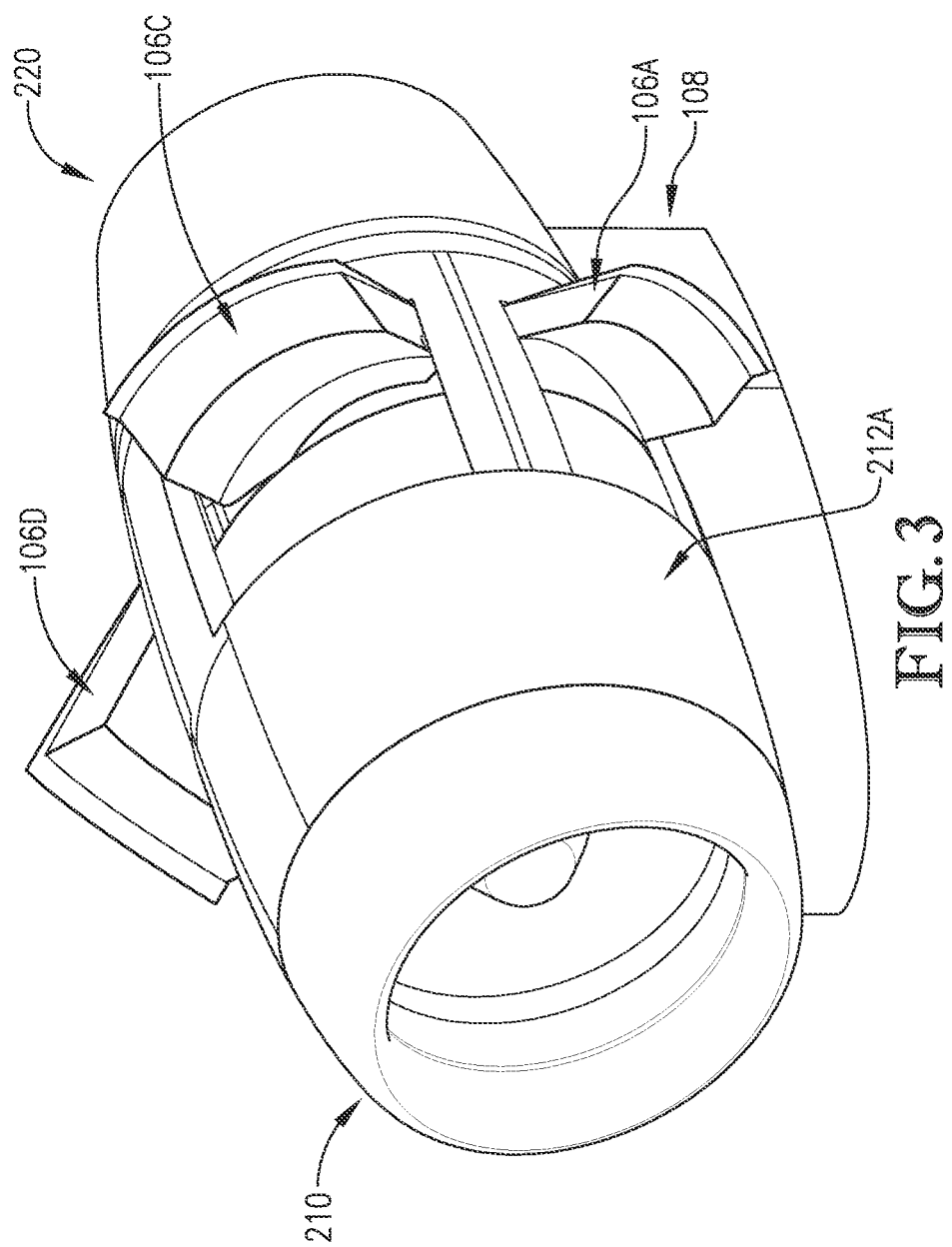
FIG. 3 is an enlarged perspective view of the engine support assembly of FIG. 2.
Figure 4:
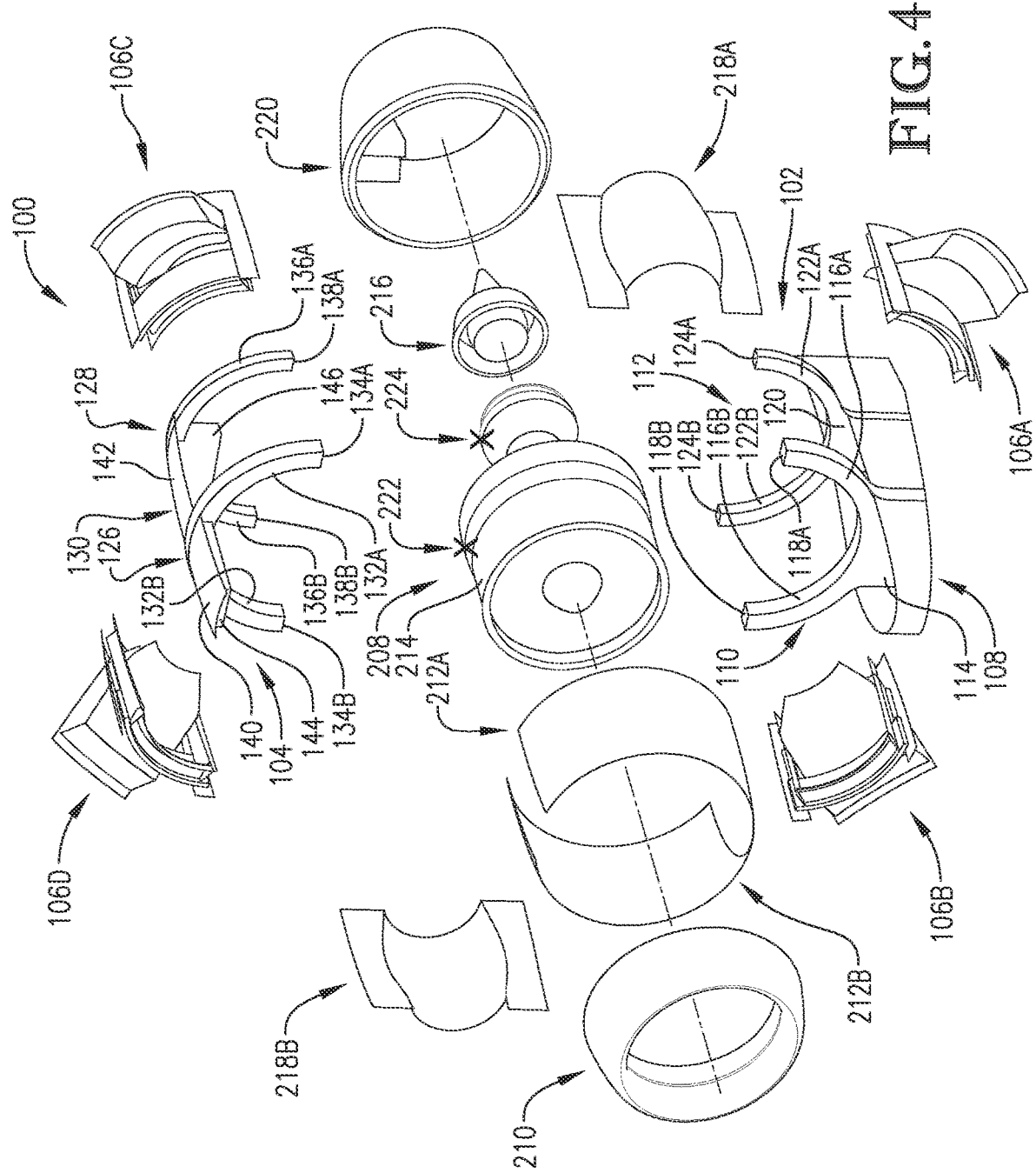
FIG. 4 is an exploded view of the engine support assembly of FIG. 2 and an associated engine.

The bypass flow modules 106A-D may include thrust reverse doors that are pivotable from a stored configuration (FIG. 2) to an activated configuration (FIG. 3). As such, and given the positioning of the bypass flow modules 106A-D around the four quadrants of the engine support assembly 100, the thrust reverse doors of bypass flow module 106A, B may open in a downward direction from the stored configuration to the active configuration, while the thrust reverse doors of bypass flow modules 106C,D may open in an upward direction from the stored configuration to the active configuration. In other embodiments, a plurality of bypass flow modules may be monolithic walls. Bypass flow modules 106A, B may be directly or indirectly connected to the first support structure 102 to form a unitary structure. Similarly, bypass flow modules 106C, D may be directly or indirectly connected to the second support structure 104 to form a unitary structure. Furthermore, the separate flow (fan bypass duct with separate primary exhaust streams) configuration used to illustrate the invention is not restrictive. A mixed flow nacelle (fan bypass and primary exhaust mix before exiting the fan duct) configuration may be provisioned by use of fan duct outer flow surface panels with an aft fan duct/nozzle adapted to provide a means to redirect fan flow to provide a braking force.

The fairing 108 encloses the bases 114, 120 of the forward attachment member 110 and rearward attachment member 112 of the first support structure 102. The fairing 108 is aerodynamically shaped to direct airflow around the first support structure 102.

Figure 5:
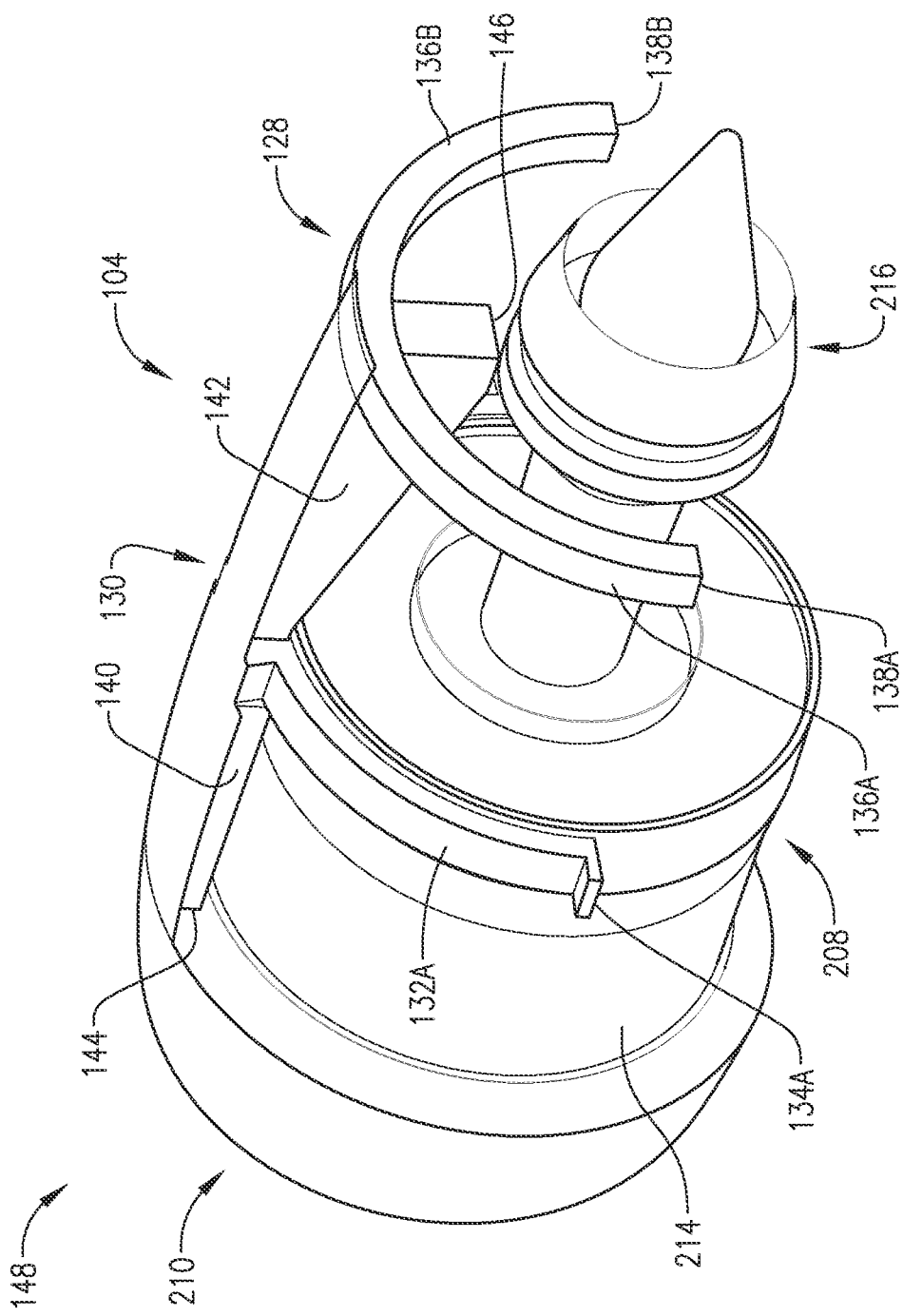
FIG. 5 is a perspective view of a quick engine change (QEC) module constructed in accordance with an embodiment of the invention.

Turning to FIG. 5, a quick engine change (QEC) module 148 may be created by pre-assembling the second support structure 104 and optionally bypass flow modules 106C,D (FIG. 3) with the engine 208 (such that the second support structure 104 straddles a portion of the engine 208) prior to being installed on the first support structure 102. At its core, the QEC module 148 includes the engine 208 and the second support structure 104 attached to an attachment interface of the engine 208. Various components may be included or excluded from the QEC module 148. For example, in a basic form, the QEC module 148 may include the engine 208, inlet 210, exhaust nozzle 216, and second support structure 104. In a more complete form, the QEC module 148 may further include the bypass flow modules 106C,D and a portion of the inner flow surface panels 218A,B.

The QEC module 148 is moved into place and connected to the first support structure 102, which is attached to or part of the aircraft 200, such that the first support structure 102 cradles a portion of the engine 208 so that the first support structure 102 and second support structure 104 cooperatively encircle the engine entirely. Bypass flow modules 106A, B are then installed to the first support structure 102 if not previously installed. The fan cowl doors 212A, B and aft fan duct 220 are then installed. Systems connections between propulsion modules, the engine 208, and the airframe (body 202) of the aircraft 200 are accomplished at stages during the QEC module 148 installation when convenient for access. Removal of the QEC module 148, and specifically the engine 208, is accomplished substantially in reverse order from installation. Notably, though, the second support structure 104 is removable from the first support structure 102, with the engine 208 being attached to the second support structure 104 (e.g., attached to the backbone assembly 130).

Although the invention has been described with reference to the preferred embodiment illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An engine support assembly for operatively connecting an engine to an aircraft, the aircraft having a support frame surrounded by a first skin and an opposing second skin, the engine support assembly comprising:
- a first support structure configured to be secured to the support frame, wherein the first support structure is configured to extend from the support frame and away from the first skin; and
- a second support structure releasably connected to the first support structure and configured to be releasably connected to the engine;
- wherein the first support structure includes a first attachment member and a second attachment member spaced apart from the first attachment member, and wherein the second support structure includes a first attachment member and a second attachment member spaced apart from the first attachment member;
- wherein the second support structure includes a first backbone section connected to a first apex of the first attachment member of the second support structure and configured to be releasably connected to a first attachment point of the engine.

2. The engine support assembly of claim 1, wherein the first attachment members are releasably connected to each other and the second attachment members are releasably connected to each other.

3. The engine support assembly of claim 2, wherein both the first and second attachment members of the first support structure include a stem configured to extend away from the support frame.

4. The engine support assembly of claim 3, wherein each of the first attachment member and the second attachment member of the first support structure includes opposing legs extending away from the stem.

5. The engine support assembly of claim 1, wherein the first attachment member and the second attachment member of the first support structure are configured to cradle a first portion of the engine and the first attachment member and the second attachment member of the second support structure are configured to straddle a second portion of the engine opposite the first portion of the engine so that the first support structure and the second support structure cooperatively encircle the engine entirely.

6. The engine support assembly of claim 1, wherein the second support structure further includes a second backbone section connected to the first apex of the first attachment member of the second support structure and a second apex of the second attachment member of the second support structure, and wherein the second backbone section is configured to be releasably connected to a second attachment point of the engine.

7. A quick engine change module for an aircraft, the aircraft having a support frame and a first support structure, the quick engine change module comprising:
- an engine, the engine having a first portion configured to be received in the first support structure of the aircraft such that the first portion is cradled by the first support structure, the engine further comprising a second portion opposite the first portion;
- a second support structure configured to be releasably connected to the first support structure, the second support structure connected to the engine and straddling the second portion of the engine, wherein when the second support structure is releasably connected to the first support structure, the first support structure and the second support structure cooperatively encircle the engine entirely;
- wherein the second support structure includes a first attachment member and a second attachment member spaced apart from the first attachment member, the first attachment member including a first apex;
- wherein the second support structure includes a first backbone section connected to the first apex of the first attachment member of the second support structure and configured to be connected to a first attachment point of the engine.

8. The support assembly of claim 7, wherein the quick engine change module further comprises a portion of a nacelle including an inlet.

9. The support assembly of claim 7, wherein the quick engine change module further comprises an exhaust nozzle.

10. The support assembly of claim 7, wherein the quick engine change module further comprises a portion of a nacelle including inner flow surface panels.

11. The support assembly of claim 7, wherein the quick engine change module further comprises a portion of a nacelle including a plurality of bypass flow modules directly or indirectly connected to the second support structure thereby supplementing rigidity of the second support structure.

* * * * *